United States Patent [19]
Wright et al.

[11] Patent Number: 5,645,324
[45] Date of Patent: Jul. 8, 1997

[54] WHEEL TRIM ATTACHMENT SYSTEM FOR IMPORT TRUCKS OR WHEELS HAVING LUG NUTS HAVING AN OFFSET

[75] Inventors: James P. Wright; Timothy L. Bates; Kevin D. Nash; Barry Lynn Roberts, all of Cookeville; John Davenport, Crossville, all of Tenn.

[73] Assignee: Phoenix USA, Inc., Cookeville, Tenn.

[21] Appl. No.: 603,729

[22] Filed: Feb. 20, 1996

[51] Int. Cl.⁶ .................................................. B60B 7/06
[52] U.S. Cl. ............................... 301/37.37; 301/108.4
[58] Field of Search ............................... 301/37.1, 37.31, 301/37.34, 37.37, 108.1, 108.4

[56] References Cited

U.S. PATENT DOCUMENTS

| | | |
|---|---|---|
| 2,037,237 | 4/1936 | Horn ........................ 301/37.31 X |
| 4,458,952 | 7/1984 | Foster et al. ............... 301/37.42 X |
| 4,639,045 | 1/1987 | Kane .......................... 301/37.37 |
| 4,932,724 | 6/1990 | Wright ....................... 301/37.37 |
| 5,443,582 | 8/1995 | Ching ........................ 301/37.37 |

*Primary Examiner*—Russell D. Stormer
*Attorney, Agent, or Firm*—Waddey & Patterson; Edward D. Lanquist, Jr.

[57] ABSTRACT

The present invention discloses a wheel trim attachment system that attaches to a yoke having a pair of collars, substantially half-moon shaped, separated by a tab. The collar is sized to fit within the offset of lug nut pairs. A bias member such as a rubber band can be used or any other kind of elastic member can be used to keep the yoke on the lug nut pairs. A mounting orifice is attached to or placed into the tab. Screws are then used to attach the wheel liner to the yoke.

9 Claims, 6 Drawing Sheets

WHEEL TRIM ATTACHMENT SYSTEM FOR IMPORT TRUCKS OR WHEELS HAVING LUG NUTS HAVING AN OFFSET

BACKGROUND OF THE INVENTION

The present invention relates generally to wheel trim attachment systems and more particularly to an attachment system for use in connection with wheels having lugs having an offset between the lug and the wheel.

It will be appreciated by those skilled in the art that truck owners desire to have decorative wheels. To this end, there have been several attempts to attach wheel trim attachment systems to the wheels. These wheel trim attachment systems must be easily attached to the wheel. Further, the wheel liner itself must be easily removed from the wheel without removing the lug nuts so that the balance and alignment of the wheel is not changed.

To this end, there have been several attempts to attach wheel trim attachment systems to wheels. However, none of the prior art systems recognize the possibilities of use in connection with wheels having lug nuts having an offset.

It will further be appreciated by those skilled in the art that commercial import trucks are very popular. These commercial import trucks have, for the most part, lug nuts having an offset between the wheel and the lug nut. To date, no one has taken advantage of this offset.

What is needed, then, is a wheel trim attachment system. This needed wheel trim attachment system must be easily attached or removed from the wheel. This needed system must be attached to the wheel without removing the existing lug nuts. This needed system must be easy to use. This needed system must be easy to remove. This needed system is presently lacking in the prior art.

SUMMARY OF THE INVENTION

The present invention discloses a wheel trim attachment system that attaches to a yoke having a pair of collars, substantially half-moon shaped, separated by a tab. The collar is sized to fit within the offset of lug nut pairs. A bias member such as a rubber band can be used or any other kind of elastic member can be used to keep the yoke on the lug nut pairs. A mounting orifice is attached to or placed into the tab. Screws are then used to attach the wheel liner to the yoke.

Accordingly, one object of the present invention is to provide a wheel trim attachment system for import trucks.

Another object of the present invention is to provide a wheel liner that can be attached to a wheel without having to remove the existing lug nuts.

Another object of the present invention is to provide a wheel trim attachment system that can be easily removed from and attached to a truck.

Another object of the present invention is to provide a wheel trim attachment system that takes advantage of the offset between the lug nut and the wheel on commercial import trucks.

DESCRIPTION OF THE PREFERRED EMBODIMENT

Figure 1:
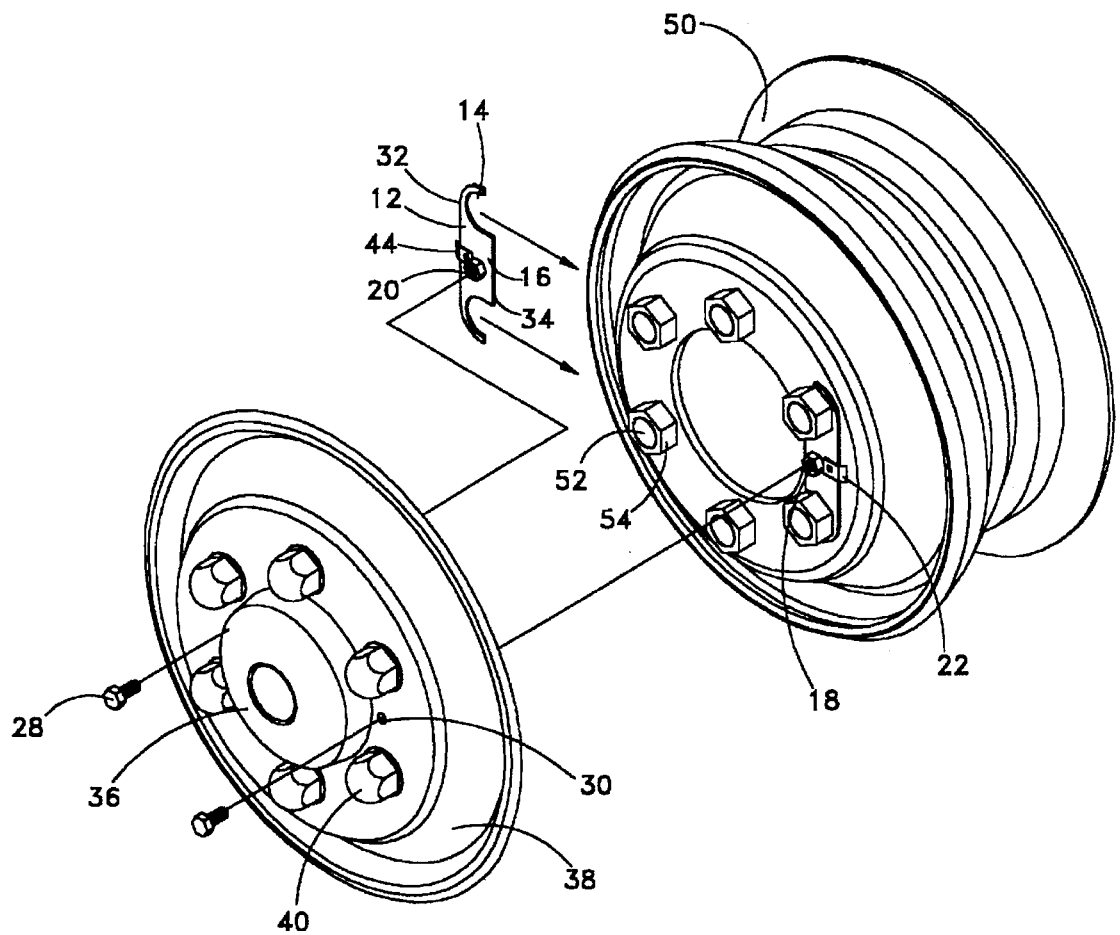
FIG. 1 is an exploded view of the wheel trim attachment system of the present invention.
Figure 6:
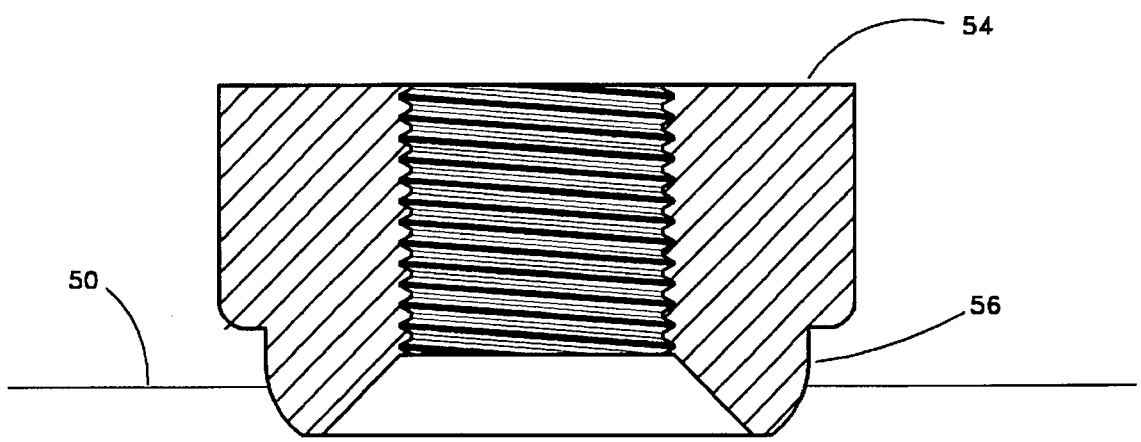
FIG. 6 is a cross section view of a lug nut found on commercial import trucks.

Referring now to FIGS. 1 and 6, there is shown generally at 10 the wheel trim attachment system of the present invention. Attachment system 10 is intended for use in connection with wheels 50 having lug nuts 54 atached to lugs 52. These wheels 50, used on commercial import trucks, have an offset 56 placed between lug nut 54 and wheel 50. Yoke 12 is provided which has a pair of collars 14 which have are substantially half-mooned or semi-circular in shape. Collars 14 partially encircle lug nuts 54 and are received by offset 56. Biased member 22 such as a spring clip 44 is provided to secure yoke 12 on the lug nut pairs 54 during wheel liner 38 installation. Yoke 12 has tab 16 between collar pair 14. In the preferred embodiment, mounting nut 20 having mounting orifice 18 is attached to tab 16. However, in place of mounting nut 20, orifice 18 can be thredably placed through tab 16. Mounting nut 20 is preferably placed between outer edge 32 and inner edge 34. In the preferred embodiment, wheel liner 38 having hub cover 36 and lug covers 40 also have openings 30 which recieve mounting screws 28 which are threadably recieved by mounting nut 20. If wheel 50 needs to be inspected, mounting screws 28 can be unscrewed and liner 38 can be removed.

Figure 2:
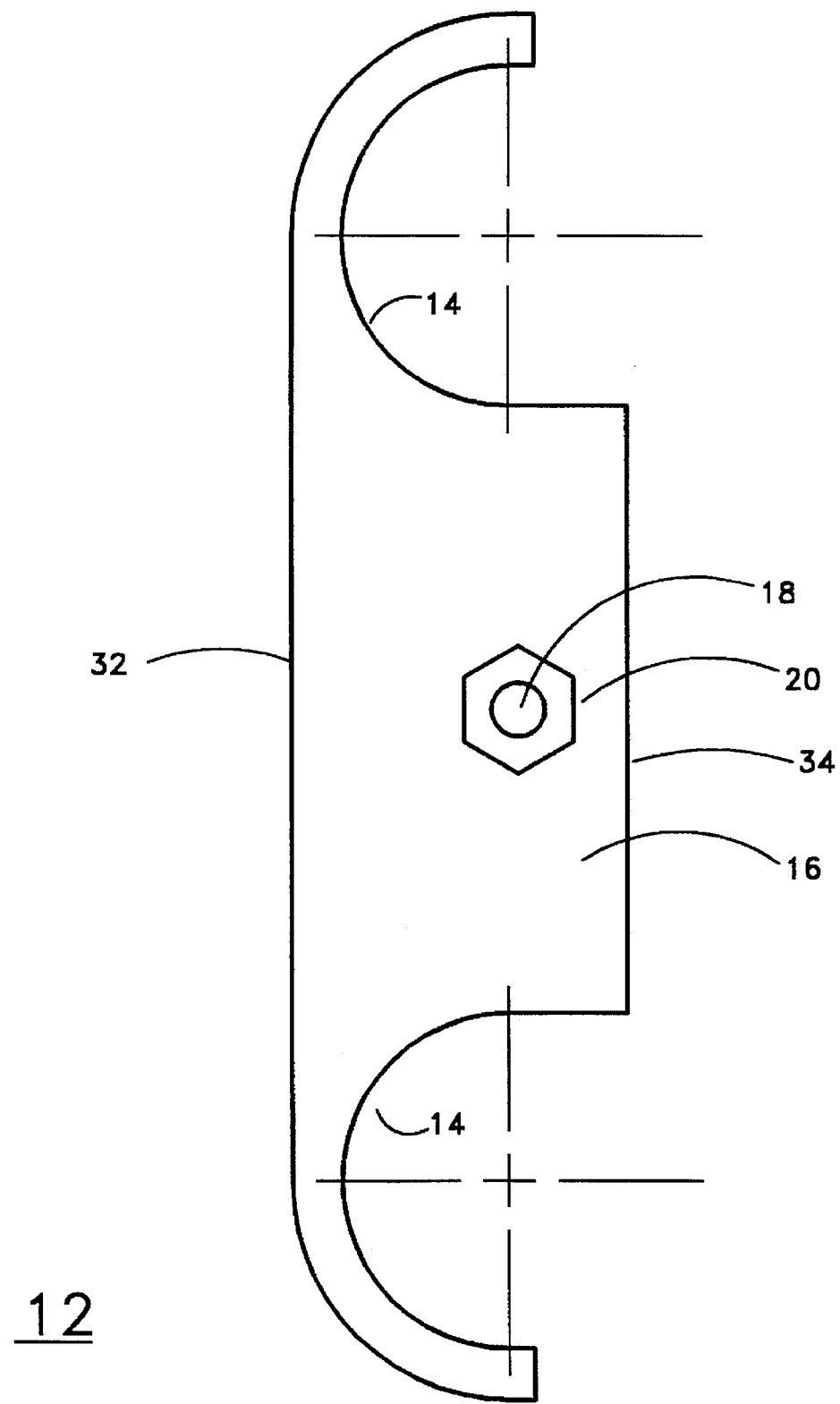
FIG. 2 is a plan view of the yoke of the present invention.

Referring now to FIG. 2, there is shown generally at 12 the yoke of the present invention. As can be seen, yoke 12 has collar pair 14 separated by tab 16. Yoke 12 has outer edge 32 and inner edge 34. Proximately centered on tab 16 there is mounting nut 20 having mounting orifice 18.

In the preferred embodiment for a six lug sixteen inch and seventeen and one-half inch wheel, center points of collars 14 are substantially 4.375 inches apart. The radius of curvature of collars 14 in the preferred embodiment is 0.7825 inches. Mounting orifice 18 is substantially centered at 2.1875 inches from center hole of collar 14.

Figure 3:
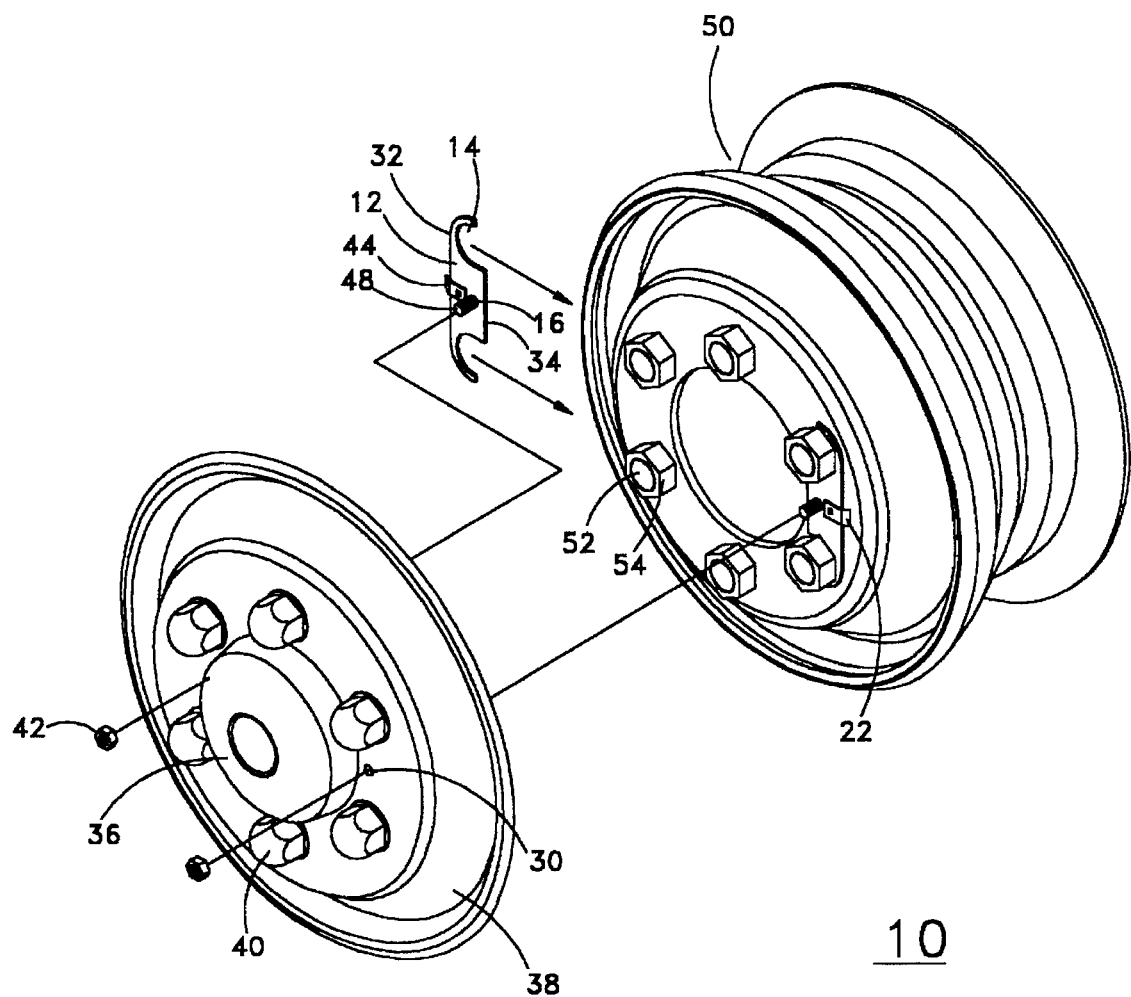
FIG. 3 is an exploded view of the wheel trim attachment of the present invention showing an alternate bracket.

Referring now to FIG. 3, there is shown generally at 10 another embodiment of the wheel trim attachment system of the present invention. In this particular embodiment, yoke 12 has generally the same design except that instead of a mounting orifice 18 or nut 20, yoke 12 has bolt 40 where orifice 18 is in FIG. 1. Bolt 40 passes through opening 30 and liner 24 is held in place by jam nuts 42.

Figure 4A:
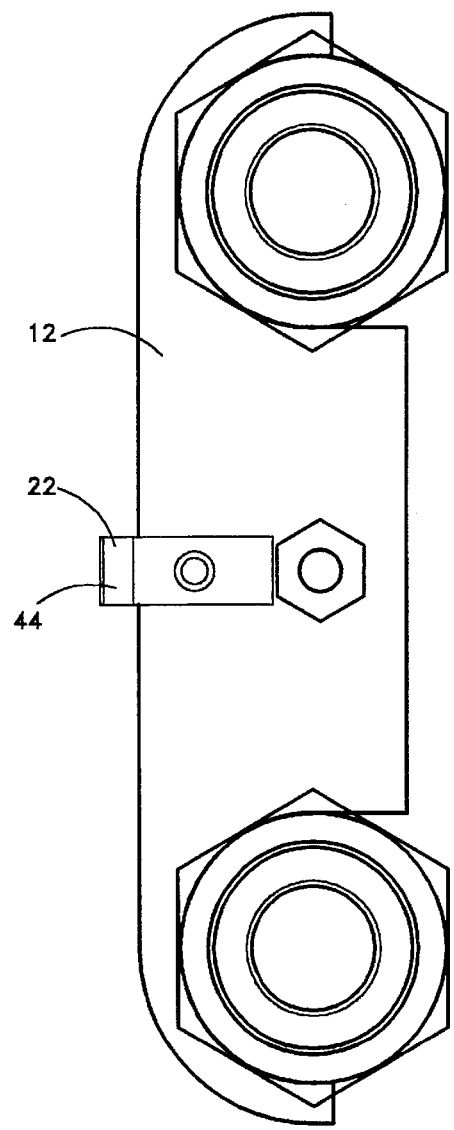
FIG. 4a is a plan view of the yoke of the present invention showing clip temporary attachment.
Figure 4B:
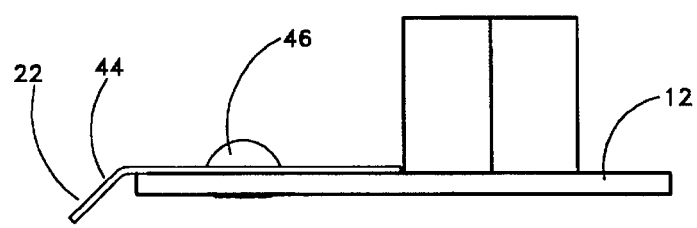
FIG. 4b is an end view of the yoke of the present invention showing a bias clip.
Figure 5:
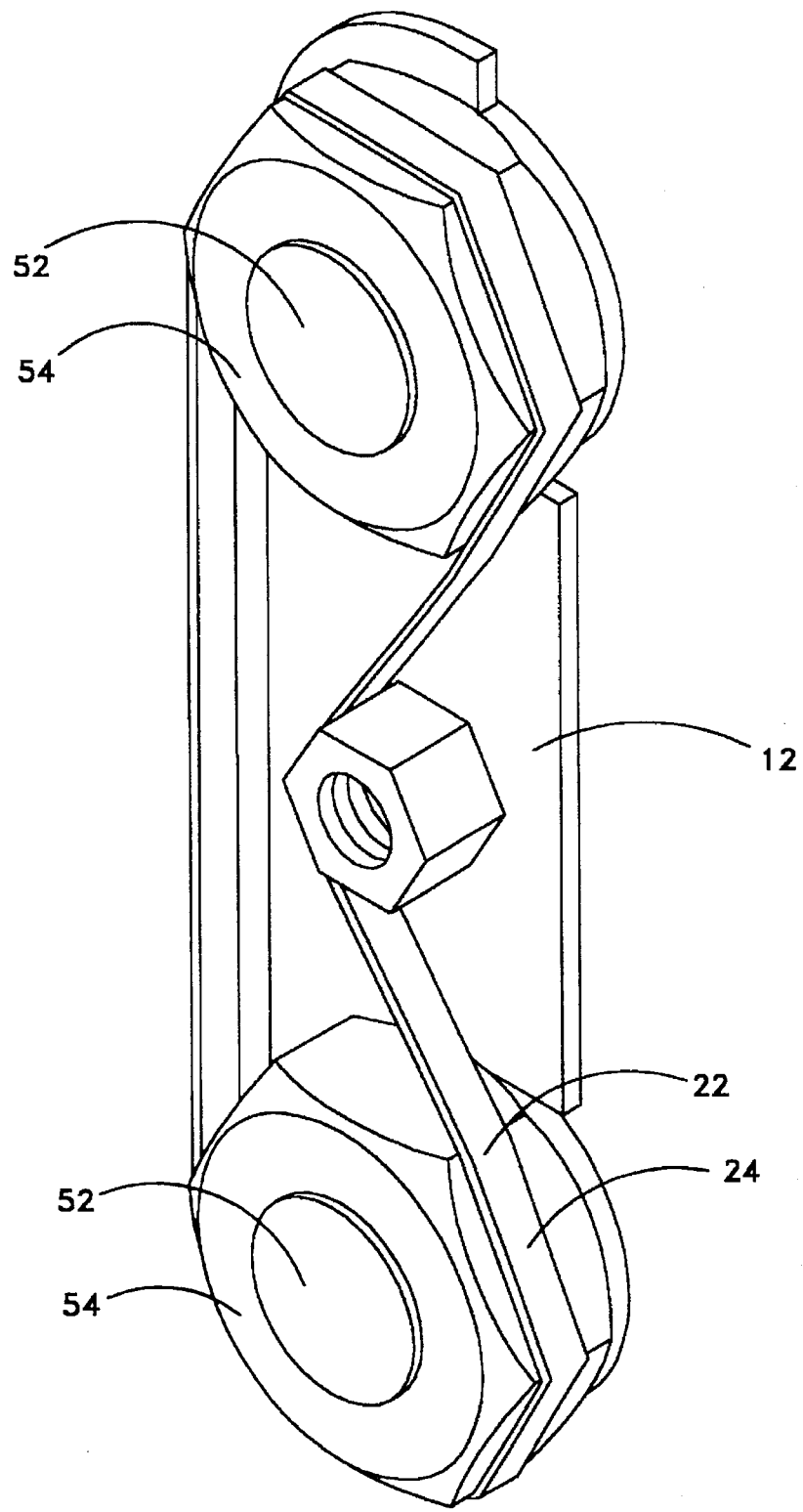
FIG. 5 is an isometric view of the yoke of the present invention showing a rubber band temporary attachment.

FIGS. 4, 5a, and 5b show some embodiments of bias member 22 of system 10 of the present invention. Regardless of method of keeping yoke 12 on the lug nut pairs 54 during installation, yoke 12 is held in place when liner 38 is attached to both yokes 12 as shown in FIGS. 1 and 3. Temporarily, something such as bias member 22 is used to hold yoke 12 in place prior to the mounting of liner 38. FIGS. 4a and 4b show bias member 22 as spring clip 44 attached to yoke 12 by rivet 46. FIG. 5 shows bias member 22 as a rubber band 24. This keeps yoke 12 secure into offset (56 in FIG. 6) until liner 38 can be mounted.

Thus, although there have been described particular embodiments of the present invention of a new and useful wheel trim attachment system for import trucks or wheels having lug nuts having an offset, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

We claim:

1. A system for attaching a wheel liner to a wheel having plural lug nuts with offsets comprising:
   a. a pair of collars each having a pair of yokes partially encircling two of said corresponding lug nuts and received by said offsets;
   b. means for attaching said liner to said mounting nut of said collars; and
   c. a pair of rubber bands, each of said rubber bands attached to each of said collars to releasibly affix each of said collars to each of said corresponding lug nuts.

2. The system of claim 1 wherein said means comprises:
   a. a pair of mounting screws placed through holes in said liner; and
   b. each of said collars having a mounting nut for receiving each of said mounting screws.

3. The system of claim 2 wherein each of said collars having a tab between said yokes having said mounting orifice.

4. The system of claim 1 wherein said means comprises:
   a. a pair of jam nuts; and
   b. each of said collars having a mounting bolt received by each of said jam nuts.

5. A system for attaching a wheel liner to a wheel of an import truck having plural lug nuts with offsets comprising:
   a. a pair of collars each having a pair of yokes partially encircling said lug nut and received by said offset;
   b. a spring clip attached to each of said collars for holding each of said collars to said lug nuts; and
   c. means for attaching said liner to said collars.

6. The system of claim 5 wherein said means for attaching said liner to said collars comprises:
   a. a pair of mounting screws; and
   b. each of said collars having a mounting nut for receiving one of said mounting screws.

7. The system of claim 5 wherein each of said collars having a tab between said yokes having said mounting nut.

8. The system of claim 5 wherein said means for attaching said liner to said collars comprises:
   a. a pair of jam nuts; and
   b. each of said collars having a bolt received by one of said jam nuts.

9. A system for attaching a wheel liner to a wheel having plural lug nuts with offsets comprising:
   a. a pair of collars each having a pair of yokes partially encircling said corresponding lug nut separated by a tab, said yokes received by said offset;
   b. a pair of rubber bands, each of said rubber bands joining one of said collars to said corresponding lug nuts;
   c. a mounting nut attached to said tab; and
   d. a pair of mounting screws placed through holes in said liner.

* * * * *